(12) United States Patent
Choo

(10) Patent No.: US 8,774,578 B2
(45) Date of Patent: Jul. 8, 2014

(54) OPTICAL MODULE AND MANUFACTURING METHOD THEREOF

(75) Inventor: Heung Ro Choo, Yuseong-Gu (KR)

(73) Assignees: Heung Ro Choo, Daejeon (KR); XL Photonics Inc., Daejeon (KR)

( * ) Notice: Subject to any disclaimer, the term of this patent is extended or adjusted under 35 U.S.C. 154(b) by 116 days.

(21) Appl. No.: 13/384,098

(22) PCT Filed: Jul. 21, 2009

(86) PCT No.: PCT/KR2009/003935
§ 371 (c)(1),
(2), (4) Date: Feb. 10, 2012

(87) PCT Pub. No.: WO2011/007909
PCT Pub. Date: Jan. 20, 2011

(65) Prior Publication Data
US 2012/0134627 A1    May 31, 2012

(30) Foreign Application Priority Data
Jul. 16, 2009  (KR) .................. 10-2009-0064997

(51) Int. Cl.
*G02B 6/26* (2006.01)
*G02B 6/32* (2006.01)
*G02B 6/42* (2006.01)
*G02B 6/28* (2006.01)

(52) U.S. Cl.
CPC *G02B 6/32* (2013.01); *G02B 6/262* (2013.01); *G02B 6/2817* (2013.01); *G02B 6/4203* (2013.01); *G02B 6/4204* (2013.01); *G02B 6/4206* (2013.01); *G02B 6/4214* (2013.01); *G02B 6/4298* (2013.01)
USPC ............................................. 385/33; 385/31

(58) Field of Classification Search
CPC ........ G02B 6/32; G02B 6/262; G02B 6/2817; G02B 6/4203; G02B 6/4204; G02B 6/4206; G02B 6/4214; G02B 6/4298
USPC ....................................... 385/31, 33
See application file for complete search history.

(56) References Cited

U.S. PATENT DOCUMENTS

| 2001/0012429 | A1* | 8/2001 | Wach et al. ................... 385/115 |
| 2002/0071459 | A1 | 6/2002 | Malone et al. |
| 2002/0176662 | A1* | 11/2002 | Melchior et al. ............. 385/31 |
| 2003/0185513 | A1* | 10/2003 | Hellman et al. ............. 385/47 |
| 2008/0138017 | A1 | 6/2008 | Kwon et al. |

FOREIGN PATENT DOCUMENTS

| EP | 1 995 834 A1 | 11/2008 |
| EP | 1995834 A1 * | 11/2008 ..................... 362/555 |

OTHER PUBLICATIONS

International Search Report w/translation from PCT/KR2009/003935 dated Jul. 27, 2010 (4 pages).

* cited by examiner

*Primary Examiner* — Jerry Blevins
(74) *Attorney, Agent, or Firm* — The Webb Law Firm

(57) ABSTRACT

An optical module includes a substrate including an optical device chip disposed on a top surface thereof, a spacer having at least one through hole and combined with the substrate on the substrate to insert the optical device chip into the through hole, a cover combined with the spacer on the spacer to stop the through hole, and an optical fiber combined with the cover on the cover in a position corresponding to a position of the optical device chip. The optical module is configured such that light transmitted through the optical fiber is incident to the optical device chip or light emitted from the optical device chip is incident to the optical fiber. The optical module may be downscaled and produced in large quantities at low cost.

12 Claims, 17 Drawing Sheets

OPTICAL MODULE AND MANUFACTURING METHOD THEREOF

CROSS-REFERENCE TO RELATED APPLICATION

This application claims priority to and the benefit of Korean Patent Application No. 2009-0064997, filed on Jul. 16, 2009, the disclosure of which is incorporated herein by reference in its entirety.

BACKGROUND

1. Field of the Invention

The present invention relates to an optical module and a method of manufacturing the same, and more particularly, to an optical module and a method of manufacturing the same, which may enable miniaturization, a reduction in the manufacturing costs in mass production, and manufacture of optical transceiver module packaging having various shapes.

2. Discussion of Related Art

With the advent of an information-oriented society, the demand for optical modules using light by which a large amount of information may be transmitted has increased. Above all, an optical module using light should not only have excellent module characteristics but also maintain the module characteristics for a long time with high reliability.

A low price should be maintained to promote the spread of optical modules for embodying fiber-to-the-home (FTTH). In particular, with an increase in the capacity of an optical transmission system, many attempts have continuously been made at reducing the size of an optical module to be mounted on the optical transmission system to increase the number of optical modules that may be mounted per unit area.

One of conventional optical module is a butterfly structure in which an optical device and an electronic device are integrated on a top surface of a platform-type substrate and put in a metal case. Another conventional optical module is a TO-CAN structure in which a top surface of an integrated stem is covered with active devices (e.g., PDs or LDs) capable of optical transmission and receiving functions.

Because a TO-CAN-type optical module requires low manufacturing costs, the TO-CAN-type optical module is being widely applied to various types of ultrahigh-speed optical communication systems. However, because there is a specific technical limit to reducing the volume of a TO-CAN package, an optical module having a new structure may be needed to enable miniaturization of optical modules.

SUMMARY OF THE INVENTION

One or more embodiments of the present invention are directed to an optical module and a method of manufacturing the same, which may enable miniaturization, a reduction in the manufacturing costs in mass production, and manufacture of optical transceiver module packaging having various shapes.

According to one or more embodiments of the present invention, there is provided an optical module including: a substrate including an optical device chip disposed on a top surface thereof, a spacer having at least one through hole and combined with the substrate on the substrate to insert the optical device chip into the through hole, a cover combined with the spacer on the spacer to close the through hole, and an optical fiber combined with the cover on the cover in a position corresponding to a position of the optical device chip.

The optical module is configured such that light transmitted through the optical fiber is incident to the optical device chip or light emitted from the optical device chip is incident to the optical fiber.

An electrode pattern may be further formed on the substrate and electrically connected to the optical device chip.

The optical module may further include an electronic device chip electrically connected to the electrode pattern. The electronic device chip may be disposed under or in the vicinity of the optical device chip.

At least one lateral surface of the substrate may protrude outward from a lateral surface of the spacer.

The optical fiber may be fixedly combined with the cover on the cover using a transparent epoxy.

An anti-reflective optical coating layer may be further formed on top and bottom surfaces of the cover.

A lens may be further formed on a top surface or bottom surface of the cover in a position corresponding to the optical fiber. When the lens is formed on a top surface of the cover, the lens may be fixedly combined with the cover using a transparent epoxy such that the lens is spaced a predetermined distance apart from the optical fiber.

A groove unit or protrusion unit having an inclined surface tilted at a predetermined angle may be formed on a top surface or bottom surface of the cover in a position corresponding to a combined position of the optical fiber.

A lens may be further formed on the reverse surface of the top or bottom surface of the cover on which the groove unit or protrusion unit is formed. When the lens is formed on the top surface of the cover, the lens may be fixedly combined with the cover using a transparent epoxy such that the lens is spaced a predetermined distance apart from the optical fiber.

When the substrate is mounted on a surface of an additional circuit substrate and the substrate including the circuit substrate, the spacer, the cover, and the optical fiber are partially molded, a protection tube may be further disposed to surround the optical fiber to prevent damage to the optical fiber.

To prevent light incident to the optical device chip through the optical fiber from being reflected back toward the optical fiber, a section of the optical fiber may be cleaved in a vertical direction or at a tilted angle to an optical axis of the optical fiber and the optical fiber may be combined with the cover on the cover at a predetermined tilted angle to the cover.

A wavelength-selective filter may be further coated on a top surface or bottom surface of the cover so that light having a specific wavelength, out of light having various wavelengths transmitted through the optical fiber, may pass through the cover.

An optical reflective layer may be further formed on a top surface or bottom surface of the cover and combined with the optical fiber in a V shape so that light having a specific wavelength, out of light transmitted to the optical fiber in one direction, may pass through the optical device chip and the remaining light may be reflected back toward the optical fiber in another direction or so that some light having the same wavelength transmitted to the optical fiber in one direction may pass through the optical device chip and the remaining light may be reflected back toward the optical fiber in another direction.

The optical device chip may be arranged on and combined with the substrate in an array shape.

According to one or more embodiments of the present invention, there is provided an optical module including: a substrate including an optical device chip disposed on a top surface thereof, a spacer layer disposed on the entire surface of the substrate to mold the optical device chip, and an optical fiber combined with and disposed on the spacer layer in a position corresponding to a position of the optical device chip. Light transmitted through the optical fiber is incident to the optical device chip, or light emitted from the optical device chip is incident to the optical fiber.

The optical fiber may be fixedly combined with the spacer layer on the spacer layer using a transparent epoxy.

According to one or more embodiments of the present invention, there is provided an optical module including: a substrate including an optical device chip disposed on a top surface thereof, a spacer having at least one through hole and combined with the substrate on the substrate to insert the optical device chip into the through hole, and a cover combined with the spacer on the spacer to stop the through hole.

According to one or more embodiments of the present invention, there is provided a method of manufacturing an optical module, including: combining at least one optical device chip with a substrate on the substrate, preparing a spacer having at least one through hole and combining the spacer with the substrate on the substrate to insert the optical device chip into the through hole, combining the cover with the spacer to stop the through hole, and combining an optical fiber with the cover on the cover using a transparent epoxy in a position corresponding to a position of the optical device chip.

The optical device chip may be arranged as an array type on the substrate and combined with the substrate.

According to one or more embodiments of the present invention, there is provided a method of manufacturing an optical module, including: preparing a substrate defined by a plurality of unit device regions, respectively arranging optical device chips on the unit device regions of the substrate and combining the optical device chips with the unit device regions of the substrate, preparing a spacer layer having a plurality of through holes and combining the spacer layer with the substrate on the substrate to respectively insert the optical device chips into the through holes of the spacer layer, combining a cover with the spacer layer to stop each of the through holes of the spacer layer, dicing the resultant structure into at least one unit device region, and respectively arranging optical fibers on the diced unit device regions of the cover in positions corresponding respectively to positions of the optical device chips and combining the optical fibers with the diced unit device regions of the cover using a transparent epoxy.

The method may further include forming an optical reflective layer on a top surface or bottom surface of the cover. The optical fiber may be separated into a first optical fiber and a second optical fiber. The first optical fiber may be aligned and combined with the cover on the cover at a predetermined tilt angle to the cover such that light having a specific wavelength or some light having the same wavelength, out of light transmitted through the first optical fiber, is incident to the optical device chip, and the second optical fiber may be aligned with the cover on the cover at a predetermined tilted angle to the cover such that light reflected by the optical reflective layer is incident to the second optical fiber. Thereafter, the first and second optical fibers may be fixedly combined with the cover using a transparent epoxy.

The method may further include forming an optical reflective layer on a top surface or bottom surface of the cover. The optical fiber may be manufactured in a V shape. A bottom surface of the optical fiber may be planarly polished and fixedly combined with the cover on the cover using a transparent epoxy so that light having a specific wavelength or some light having the same wavelength, out of light transmitted through the optical fiber tilted in one direction, may be incident to the optical device chip and light reflected by the optical reflective layer may be incident to the optical fiber tilted in another direction.

According to one or more embodiments of the present invention, there is provided a method of manufacturing an optical module, including: combining at least one optical device chip with a substrate on the substrate, forming a spacer layer on the entire surface of the substrate using a transparent epoxy to mold the optical device chip, and combining an optical fiber with the spacer layer on the spacer layer in a position corresponding to a position of the optical device chip using a transparent epoxy.

BRIEF DESCRIPTION OF THE DRAWINGS

The above and other objects, features and advantages of the present invention will become more apparent to those of ordinary skill in the art by describing in detail embodiments thereof with reference to the accompanying drawings, in which.

DETAILED DESCRIPTION OF INVENTION

Embodiments of the present invention will now be described more fully with reference to the accompanying drawings in which one or more embodiments are shown. The present invention may, however, be embodied in different forms and should not be construed as limited to the embodiments set forth herein. Rather, these embodiments are provided so that this disclosure is thorough and complete and fully conveys the scope of the present invention to one skilled in the art.

Figure 1:
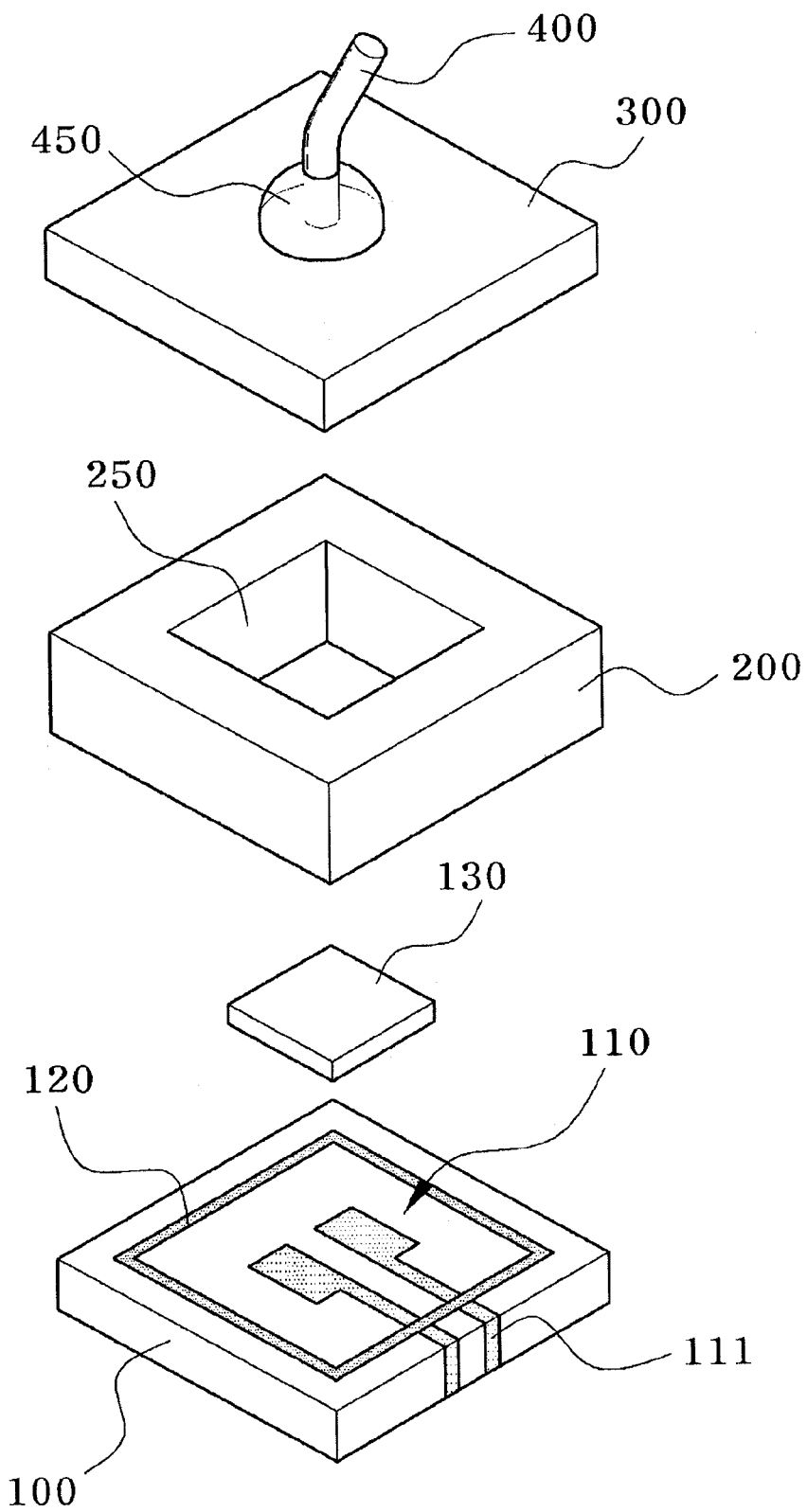
FIGS. 1 through 3 are respectively an exploded perspective view, a combined perspective view, and a combined cross-sectional view of an optical module according to one or more embodiments of the present invention.
Figure 2:
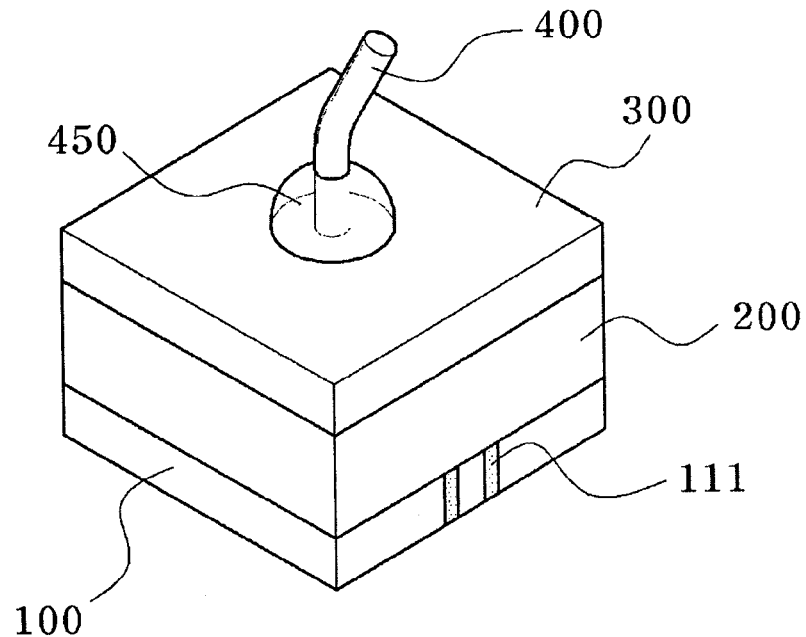
Figure 3:
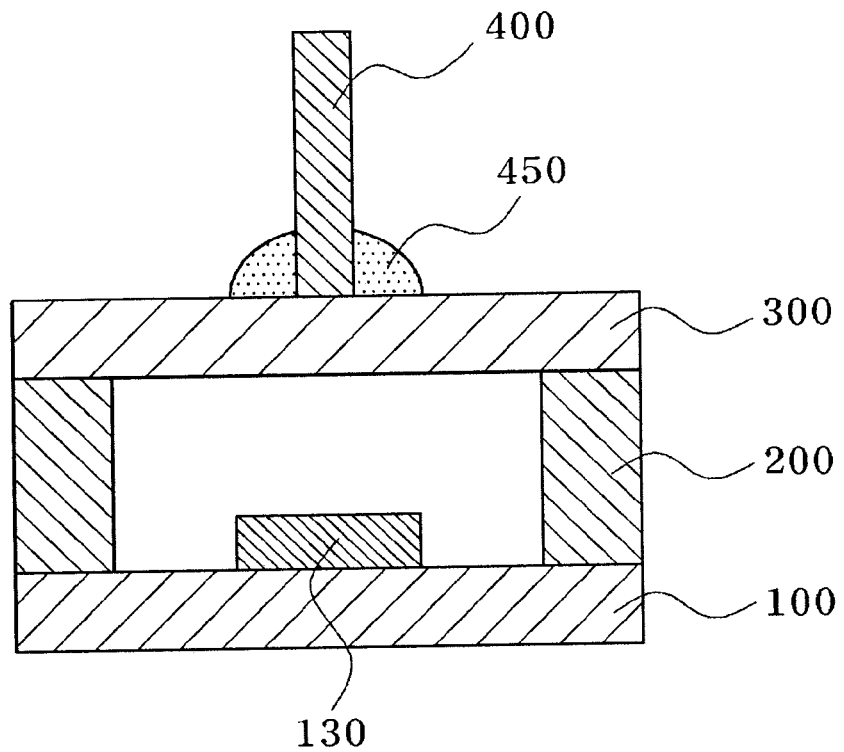
Figure 4:
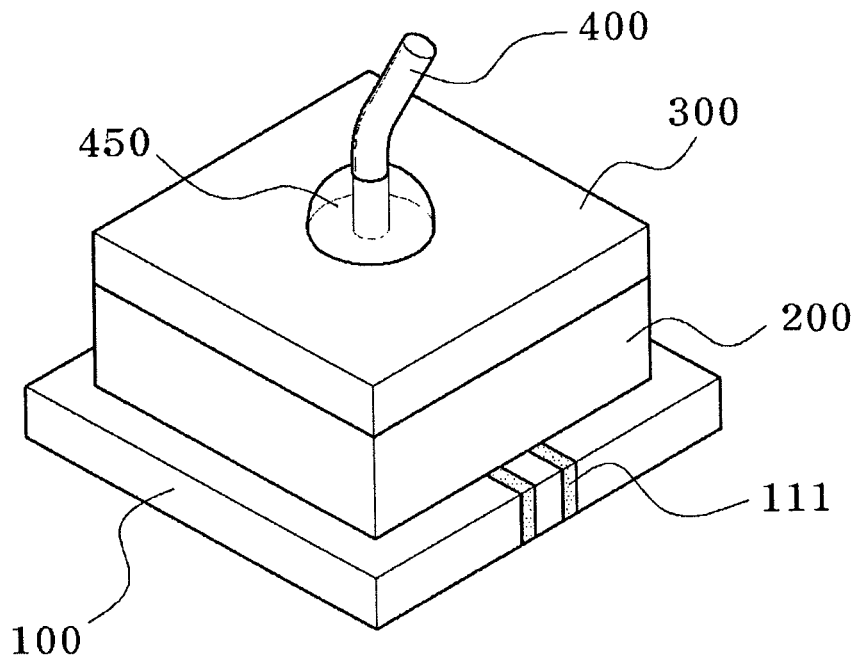
FIG. 4 is a combined perspective view of an optical module having another example of a substrate structure according to one or more embodiments of the present invention.

FIGS. 1 through 3 are respectively an exploded perspective view, a combined perspective view, and a combined cross-sectional view of an optical module according to one or more embodiments of the present invention, and FIG. 4 is a combined perspective view of an optical module having another example of a substrate structure according to one or more embodiments of the present invention.

Referring to FIGS. 1 through 4, the optical module according to one or more embodiments of the present invention may largely include a substrate 100, a spacer 200, a cover 300, and an optical fiber 400.

The substrate 100 may have, for example, a tetragonal plate shape, and an optical device chip 130 may be disposed on the substrate 100. The substrate 100 may serve as a base to which the spacer 200 and the cover 300 are fixed. The substrate 100 may be formed of, for example, a semiconductor, a printed circuit board (PCB), a ceramic, glass, or a plastic.

An electrode pattern 110 including a plurality of electrodes 111 may be formed on the substrate 100 so that the optical device chip 130 or both the optical device chip 130 and an electronic device chip 150 (refer to FIGS. 17 and 18) may be connected to the substrate 100 using, for example, a die-bonding technique and a wire-bonding technique. The electrode pattern 110 may extend to one lateral surface of the substrate 100 to facilitate electrical connection of the optical module with an external circuit.

As shown in FIG. 4, the substrate 100 may be provided with a slightly greater size than the spacer 200 to expose the electrodes 111, which is to be connected to another circuit, outward from the spacer 200. Alternatively, the substrate 100 can be patterned with via holes in a wafer and then patterned to form electrode. Thereafter, the substrate 100 can be diced centering on the via hole so that internal electrodes 111 may be naturally connected to an external circuit.

Meanwhile, in the case of a simple photodiode (PD) or a simple laser diode (LD), such as a vertical-cavity surface emitting LD (VCSEL), which needs only two electrodes 111, it may only be necessary to prepare the electrode pattern 110 including two electrodes 111 on the substrate 100. When a PD optical module with an integrated transimpedance amplifier (TIA) requires a plurality of electrodes 111 or when an LD needs a monitor PD, electrodes 111 may be formed in a required number.

Meanwhile, a combination between the substrate 100 and the spacer 200 and a combination between the spacer 200 and the cover 300 may be reliably enabled by, for example, epoxy, solder, or a metal. In this case, when the solder or the metal is used, a metal or solder pattern 120 having a desired shape may be formed or deposited on both contact surfaces to be contacted using a typical semiconductor process and bonded to each other. In this case, an additional insulating layer may be formed between the electrode pattern 110 and the metal or solder pattern 120.

The spacer 200 may be an intermediate layer configured to control a height between the substrate 100 and the cover 300, and maintain optical coupling between the optical device chip 130 and the optical fiber 400 constant.

The spacer 200 may have a pillar shape (e.g. square pillar, cylinder, or hexagonal pillar) having a predetermined height from a plane surface of the substrate 100. A through hole 250 may be formed through predetermined regions (e.g., central portions) of top and bottom surfaces of the spacer 200. The through hole 250 may serve not only to protect the optical device chip 130 from the outside when the optical device chip 130 is inserted into the through hole 250 and combined with the substrate 100, but also to determine an appropriate distance in a combined optical system including the optical device chip 130, the cover 300, and the optical fiber 400.

In addition, the through hole 250 may be formed to a greater size than the optical device chip 130 such that the optical device chip 130 is inserted into the through hole 250 a predetermined distance apart from the through hole 250.

Meanwhile, the spacer 200 may be formed of, for example, a metal, a glass, a plastic, a polymer, a ceramic, or a semiconductor. In particular, the spacer 200 may be formed of a hard material having a coefficient of linear expansion similar or about equal to that of the substrate 100 or the cover 300.

The cover 300 may be combined with the spacer 200 on the spacer to stop the through hole 250 of the spacer 200. The cover 300 may typically have a tetragonal plate shape.

The cover 300 may be formed of a transparent material in the wavelength of a desired light source. The cover 300 may be formed of glass, a plastic, or a semiconductor substrate having both surfaces polished. For example, although a semiconductor substrate formed of silicon, indium phosphide (InP), or gallium arsenide (GaAs) is opaque in a visible (V) light region, because the semiconductor substrate transmits light in a bandwidth of about 1.3 μm or 1.5 μm, which is a wavelength of long-wavelength optical communications, the semiconductor substrate may be used as the cover 300 according to one or more embodiments of the present invention. Although not shown, the cover 300 may be used after an anti-reflective coating (ARC) process is performed on the both polished surfaces of the cover 300 to reduce reflection loss.

In addition, the optical fiber 400 may be typically configured to transmit information using light. The optical fiber 400 may be aligned with the cover 300 on the cover 300 in a position corresponding to a position of the optical device chip 130 and combined with the cover 300 using, for example, a transparent epoxy 450.

As described above, the optical fiber 400 may be fixed to the cover 300 so that light may be incident from the optical fiber 400 to the optical device chip 130 or conversely, light emitted by the optical device chip 130 may be incident to the optical fiber 400.

For example, when the optical device chip 130 is a PD, which is a light receiving device, the optical fiber 400 may be aligned with the PD such that light output by the optical fiber 400 is coupled with the PD as much as possible. When the optical device chip 130 is an emission device, such as an LD or a light emission diode (LED), the optical fiber 400 may be aligned with the emission device and fixed using a transparent epoxy 450 such that light emitted by the optical device chip 130 is coupled with the optical fiber 400 as much as possible.

In this case, the alignment of the optical fiber 400 may be performed using either one of active alignment and passive alignment. In the case of the passive alignment, required patterns should be formed in the substrate 100 and the cover 300 to enable precise alignment of the optical fiber 400 with the optical device chip 130 adhered to the substrate 100.

In the case of the active alignment, a position where light emitted from a light source of the optical device chip 130 fixed to the substrate 100 is actually coupled with the optical fiber 400 or light output by the optical fiber 400 is coupled with the PD as much as possible may be obtained, and the optical fiber 400 may be fixed to the cover 300 in the obtained position by curing the transparent epoxy 450.

The optical module having the above-described configuration according to one or more embodiments of the present invention may be completed by sequentially stacking the substrate 100 to which the optical device chip 130 is adhered, the spacer 200, and the cover 300, aligning the optical fiber 400 with the optical device chip 130 in a position corresponding to a position of the optical device chip 130, and fixing the optical fiber 400 to the cover 300 using the transparent epoxy 450 in a desired wavelength (or in a desired transmission wavelength).

Meanwhile, although the optical module according to one or more embodiments of the present invention is configured by combining the substrate 100, the spacer 200, the cover 300, and the optical fiber 400, embodiments of the present invention are not limited thereto and without fixing the optical fiber 400 to the cover 300, the cover 300 may be directly adhered to an output of a planar lightwave circuit (PLC) substrate or input waveguide and used.

Furthermore, the efficiency of optical coupling between the optical device chip 130 and the optical fiber 400 may depend on the shape and thickness of the cover 300, the thickness of the spacer 200, and the position of the optical device chip 130 in the structure.

FIGS. 5 through 11 are cross-sectional views of various examples of combined structures of an optical fiber according to one or more embodiments of the present invention.

Referring to FIGS. 5 through 11, when an optical device chip 130 including a PD has a sufficiently large light-reception area, as shown in FIGS. 1 through 4, the cover 300 having both planar surfaces may be adopted, and the optical fiber 400 having a vertically cut section may be directly adhered to the cover 300 and used. Also, when necessary, an anti-reflective optical coating layer may be formed on both surfaces of the cover 300 and used.

To couple light having a high light intensity with the PD or improve efficiency of coupling between light emitted by a surface-emitting light source, such as a VCSEL and an LED, and the optical fiber 400, a lens 310a or 310b may be formed on the cover 300.

Figure 5:
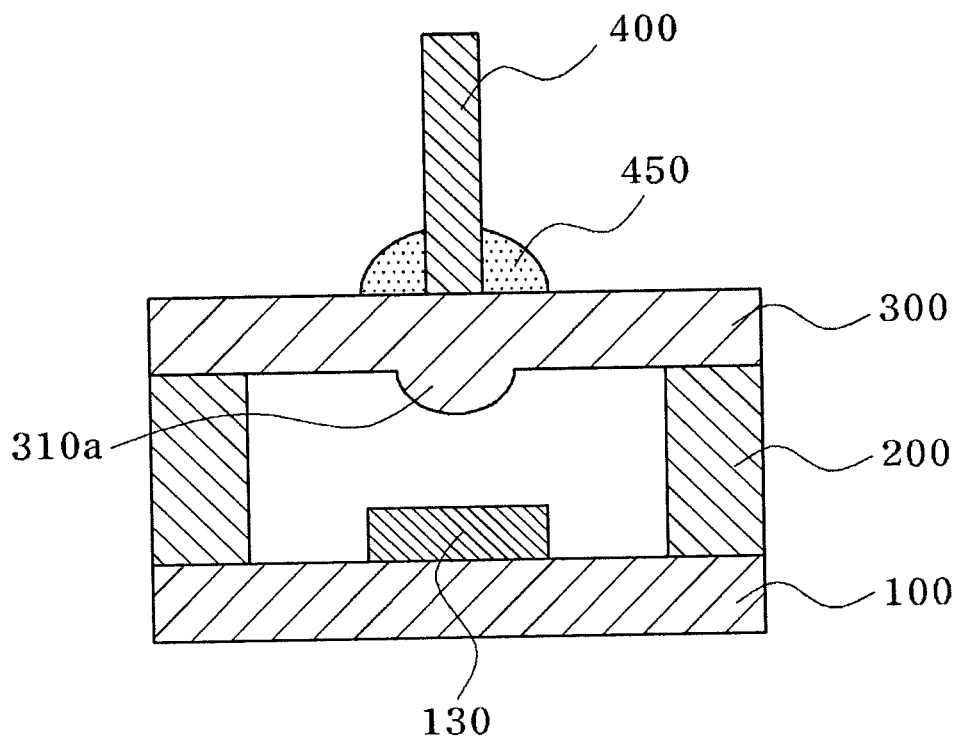
FIGS. 5 through 11 are cross-sectional views of various examples of combined structures of an optical fiber according to one or more embodiments of the present invention.
Figure 6:
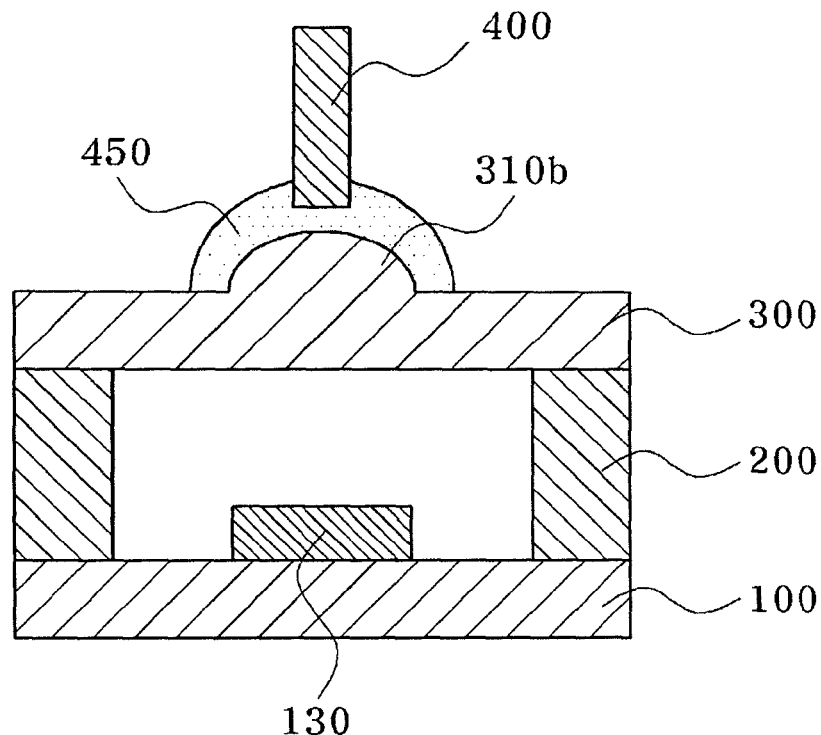
Figure 7:
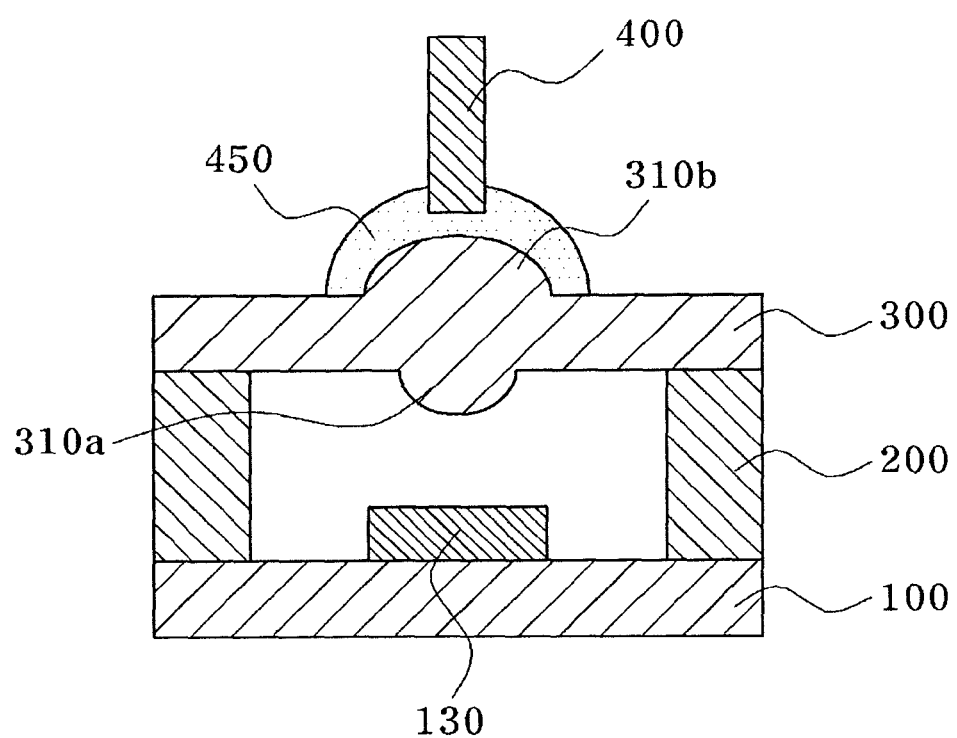

For example, as shown in FIG. 5, the lens 310a may be formed on a bottom surface of the cover 300, which is the reverse surface of a surface of the cover 300 on which the optical fiber 400 is formed. Alternatively, as shown in FIG. 6, the lens 310b may be formed on a top surface of the cover 300 on which the optical fiber 400 is formed. Alternatively, as shown in FIG. 7, the lenses 310a and 310b may be respectively formed on the top and bottom surfaces of the cover 300.

In this case, when the lens 310b is formed on the top surface of the cover 300, the lens 310b may be fixed using the transparent epoxy 450 such that the lens 310b is spaced a predetermined distance apart from the optical fiber 400.

The lenses 310a and 310b may be easily manufactured using a semiconductor etching process. Similarly, it is natural for an anti-reflective optical coating layer to be formed on both the top and bottom surfaces of the cover 300 when necessary.

Furthermore, as shown in FIGS. 8 through 11, the amount of light reflected back toward the optical fiber 400 may be effectively reduced by changing the shape of the cover 300.

Figure 8:
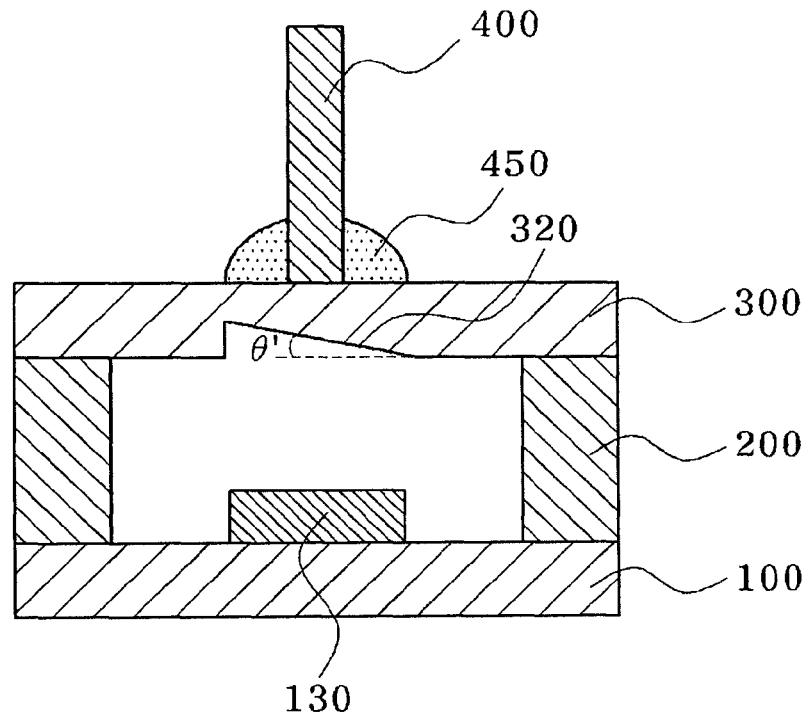

For example, FIG. 8 illustrates a groove-type inclined surface 320 formed in the bottom surface of the cover 300 according to one or more embodiments of the present invention. By use of the cover 300 having the above-described structure, an optical fiber 400 having a cleaved surface vertical to an optical axis of the optical fiber 400 may be used, and light reflected back by the optical device chip 130 may be effectively prevented from being re-incident to the optical fiber 400.

In this case, an angle θ' of the inclined surface 320 at which reflected light may be effectively cut off may depend on a distance between the optical device chip 130 and the cover 300, a refractive index of the cover 300, a desired polarization dependence, and a desired amount of reflection. In general, when the cover 300 includes a glass material having a refractive index of about 1.5, the inclined surface 320 may have an angle θ' of about 6° to about 10°. When the cover 300 includes a silicon semiconductor having a refractive index of about 3.4, it may be satisfactory for the inclined surface 320 to have an angle θ' of about 2° to about 4°.

Figure 10:
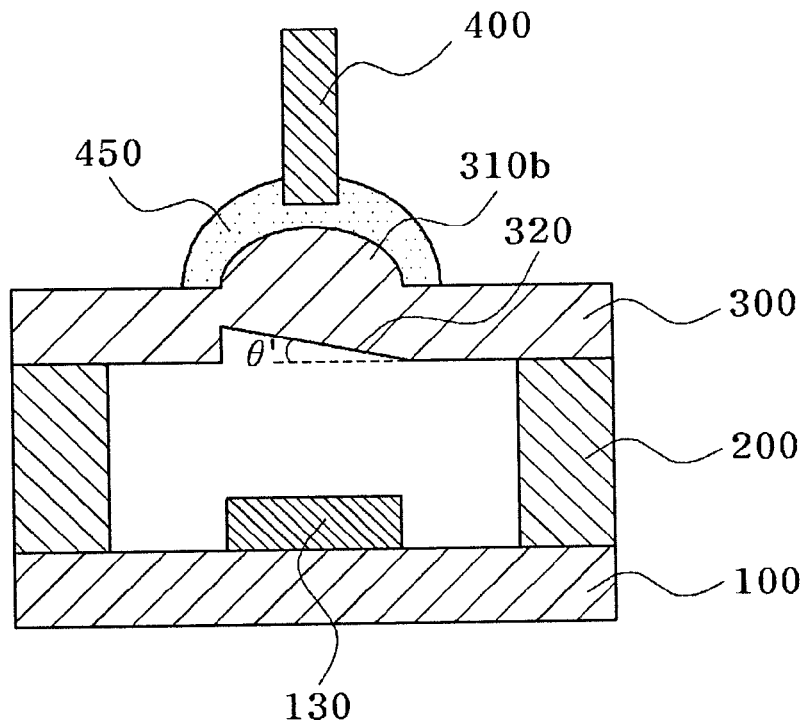

Furthermore, as shown in FIG. 10, after the inclined surface 320 is formed in the cover 300, the lens 310b described with reference to FIG. 6 may be formed on a top surface of the cover 300 to which the optical fiber 400 will be adhered. This may lead to an improvement in efficiency of coupling of light incident to the optical fiber 400 with the optical device chip 130 or, on the contrary, an improvement in efficiency of coupling of light emitted from the optical device chip 130 with the optical fiber 400.

The above-described cover 300 may be shaped using several processes used in a semiconductor process. For example, the cover 300 may be formed of a glass material using a precision molding process or formed of silicon using a directional etching process and a dry etching process.

Figure 9:
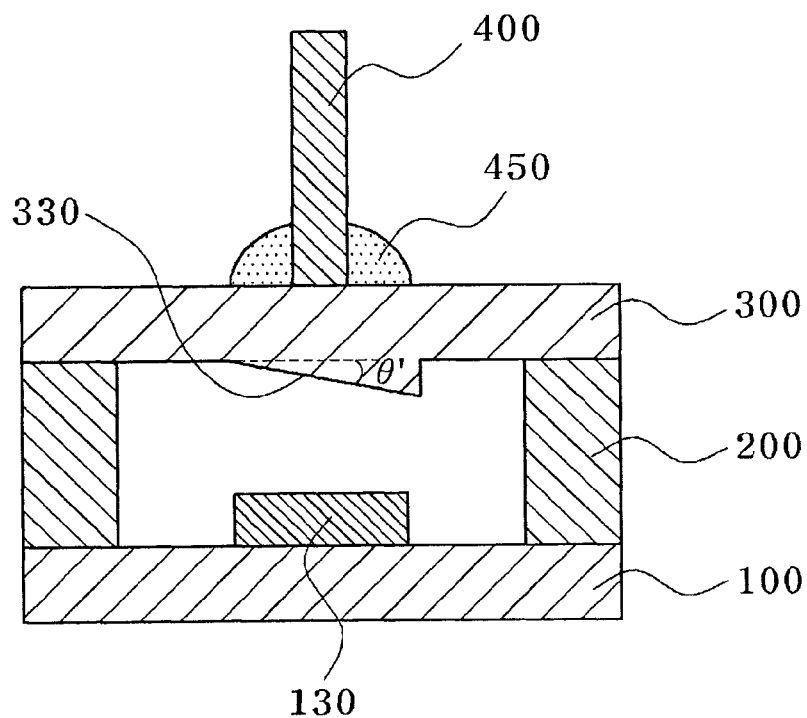
Figure 11:
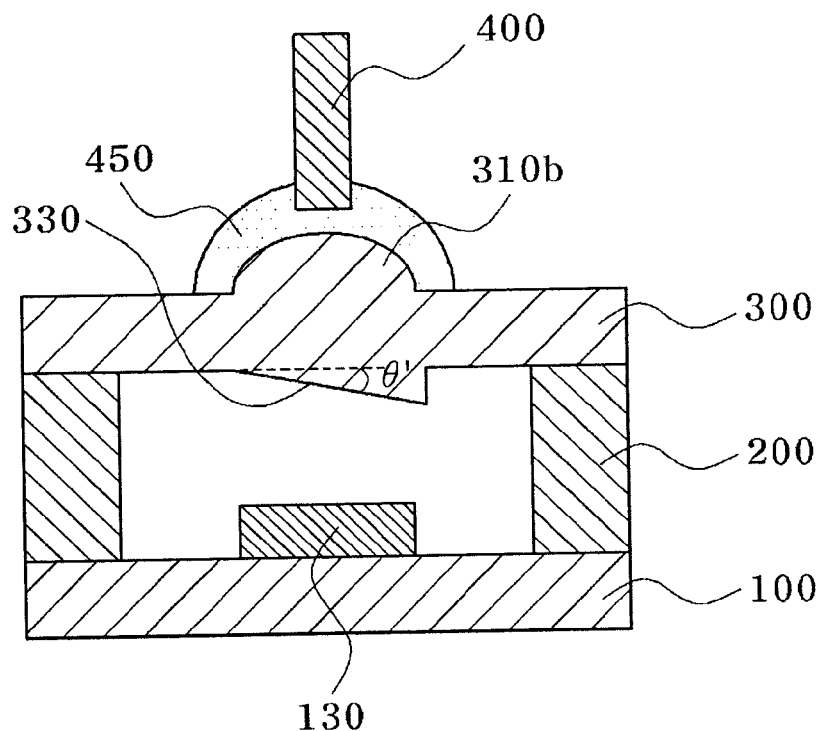

Unlike FIG. 8, FIG. 9 shows a structure in which a protruding inclined surface 330 is formed on a bottom surface of the cover 300. However, the structure of FIG. 9 may produce the same effects as that of FIG. 8. In addition, as shown in FIG. 11, after the protruding inclined surface 330 is formed on the bottom surface of the cover 300, the lens 310b described with reference to FIG. 6 may be formed on a top surface of the cover 300 to which the optical fiber 400 will be adhered. This may lead to an improvement in efficiency of coupling of light incident to the optical fiber 400 with the optical device chip 130 or, on the contrary, an improvement in efficiency of coupling of light emitted from the optical device chip 130 with the optical fiber 400.

In addition, it is natural for a desired optical coating layer to be deposited on the top and bottom surfaces of the cover 300. In the above-described structure, the inclined surface 320 or 330 may be formed on the top surface of the cover 300. In this case, as shown in FIG. 5, the lens 310a may be formed on the bottom surface of the cover 300.

Figure 12:
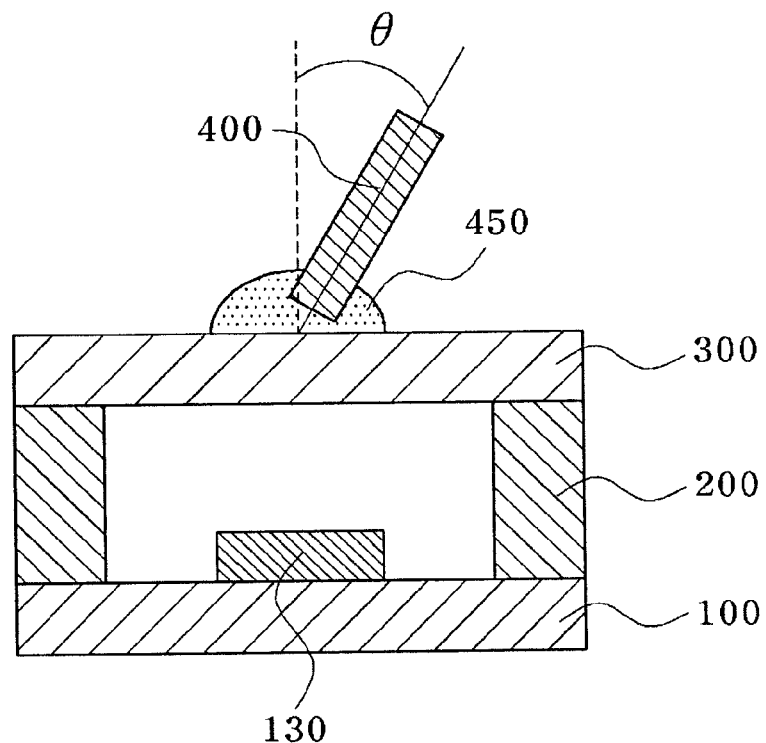
FIGS. 12 through 14 are cross-sectional views of various combined structures of an optical fiber according to one or more embodiments of the present invention.
Figure 13:
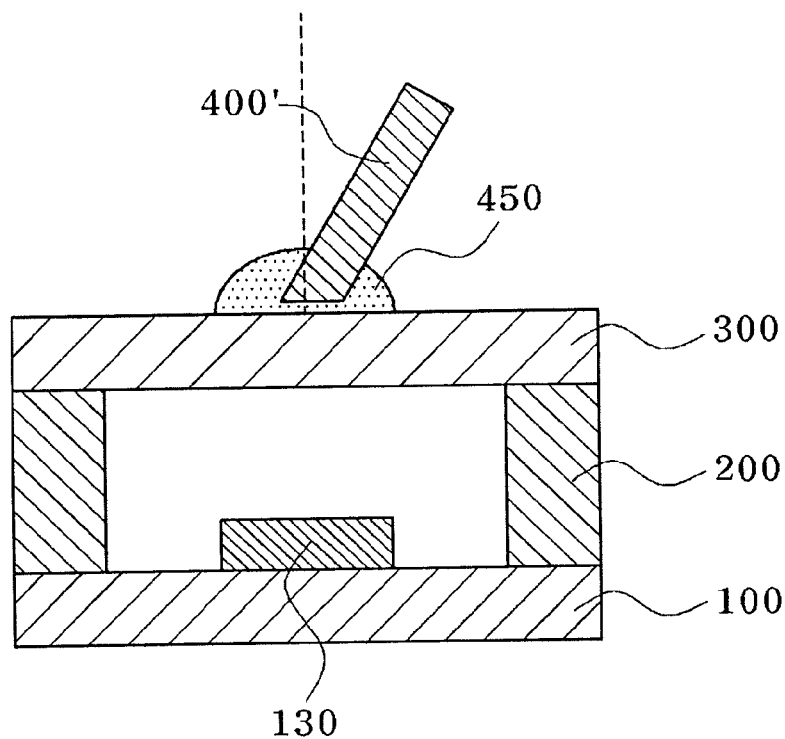
Figure 14:
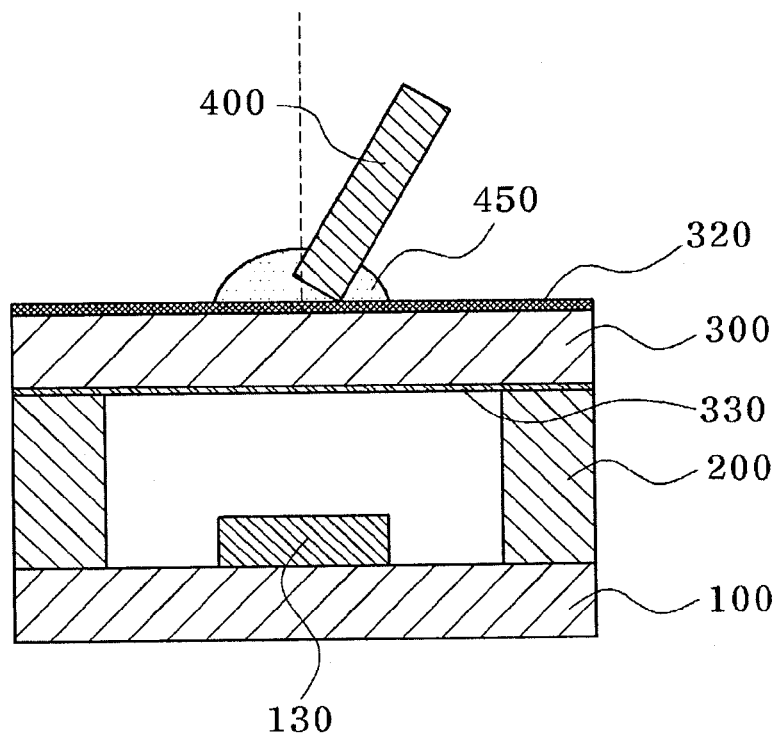

FIGS. 12 through 14 are cross-sectional views of various combined structures of an optical fiber according to one or more embodiments of the present invention.

Referring to FIGS. 12 through 14, it may be advantageous to align an optical fiber 400 with a light receiving surface or light emission surface of an optical device chip 130 in a straight line so that light emitted from the optical fiber 400 may be incident to the optical device chip 130 or light emitted by the optical device chip 130 may be incident to the optical fiber 400. However, an optical module should maximally prevent light incident to the optical device chip 130 through the optical fiber 400 from being reflected back and incident to the optical fiber 400.

In the optical module, to reduce re-reflection (known as "return loss" or "back reflection") of light, which is incident to the optical device chip 130 through the optical fiber 400, toward the optical fiber 400, the optical fiber 400 may be adhered to a cover 300 not in a vertical direction to the cover 300 but at a predetermined tilted angle to the cover 300 as shown in FIG. 12 so that the amount of light reflected back to the optical fiber 400 can be effectively reduced.

In this case, the optical fiber 400 may be tilted at an angle θ of about 6° to about 8°. In the case of a PD, coupling efficiency may depend on a light receiving area of the PD. In an InGaAs PD with a sufficient light receiving area, when the cover 300 includes a silicon layer having both surfaces coated with an anti-reflective optical coating layer, even if a single-mode optical fiber 400 is adhered to the cover 300 at a tilted angle of about 20°, incident-light coupling efficiency of about 85% or higher may be ensured.

In the optical module, the optical fiber 400 having a cut section vertical to an optical axis of the optical fiber 400 may be used as shown in FIG. 12, or an optical fiber 400' having a cut section tilted to the optical axis of the optical fiber 400' may be adhered and used as shown in FIG. 13.

Meanwhile, by use of the optical module according to one or more embodiments of the present invention, a wavelength-selective PD optical module required for wavelength division multiplexing (WDM) optical communications may be easily manufactured.

Specifically, a wavelength-selective PD optical module may be configured such that only light having a specific wavelength, out of light having various wavelengths transmitted through the optical fiber 400, is transmitted, incident to a PD, and detected. To manufacture the wavelength-selective PD optical module, as shown in FIG. 14, at least one surface of the cover 300 may be coated with a thin multilayered wavelength-selective filter (or band-pass filter) 320 so that only the light having the specific wavelength can be transmitted and detected. In this case, when one surface of the cover 300 is coated with the wavelength-selective filter 320, the other surface of the cover 300 can be naturally coated with an anti-reflection optical coating layer to increase desired effects.

Figure 15:
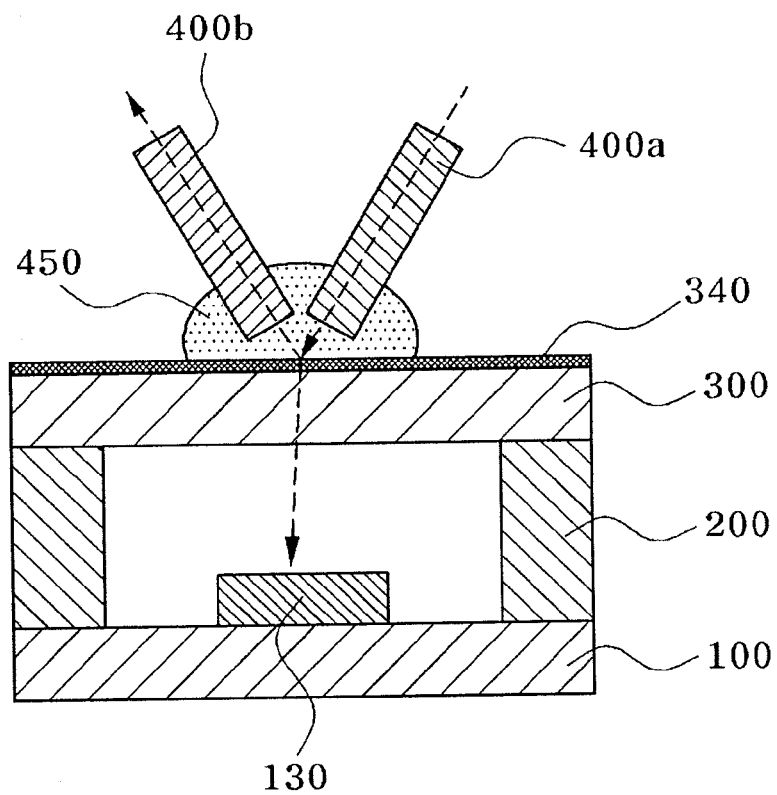
FIGS. 15 and 16 are cross-sectional views of other examples of a cover and an optical fiber structure according to one or more embodiments of the present invention.
Figure 16:
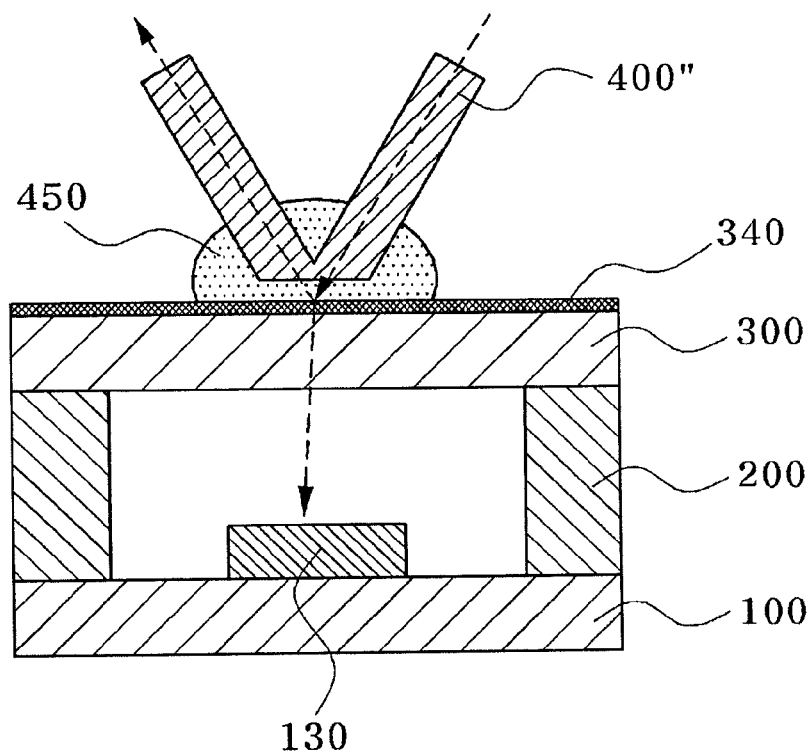

FIGS. 15 and 16 are cross-sectional views of other examples of structures of a cover and an optical fiber according to one or more embodiments of the present invention.

Referring to FIGS. 15 and 16, a tap-coupler PD or beam-splitting (or wavelength-selective) PD optical module may be easily manufactured by changing structures of the cover 300 and the optical fiber 400 applied to one or more embodiments of the present invention.

Specifically, a top-coupler PD optical module may be configured such that some light incident through a first optical fiber 400a is incident to an optical device chip 130, which is a PD, to monitor the intensity of incident light and the remaining light passes through a second optical fiber 400b disposed in another path. To manufacture the top-coupler PD optical module, as shown in FIG. 15, an optical reflective layer 340 may be formed on a top or bottom surface of the cover 300 to control the transmittance and reflection rate of incident light transmitted through the first optical fiber 400a so that only a desired amount of light may pass through the optical device chip 130 and the remaining light may be reflected back to the second optical fiber 400b. In this case, the first and second optical fibers 400a and 400b may be adhered to the cover 300 in a V shape.

A method of manufacturing the above-described top-coupler PD optical module may include, firstly, aligning light transmitted through the first optical fiber 400a with the optical device chip 130 to obtain desired coupling therebetween, aligning the second optical fiber 400b in the aligned state so that reflected light is incident to the second optical fiber 400b, applying a transparent epoxy 450 between the first and second optical fibers 400a and 400b, and performing a precise alignment process to obtain a desired coupling value. In this case, the transparent epoxy 450 may be cured using heat or ultraviolet (UV) light.

Although the first and second optical fibers 400a and 400b are separately prepared and combined with each other as shown in FIG. 15, embodiments of the present invention are not limited thereto. As shown in FIG. 16, optical fibers may be combined with each other to form a V-shaped optical fiber 400'', and a bottom surface of the V-shaped optical fiber 400'' may be polished and adhered to a cover 300 thinly coated with an optical reflective layer 340. In this case, the same results as shown in FIG. 15 may be obtained, and a process of aligning optical fibers may be simplified.

As described above, when the optical modules shown in FIGS. 15 and 16 are manufactured by controlling the transmittance and reflection rate of light having the same wavelength using the optical reflective layer 340, a tap-coupler PD optical module or a beam-splitting (or wavelength-selective) PD optical module may be easily manufactured. The tap-coupler PD optical module may be configured such that only some (e.g., 1 or 2%) light having the same wavelength transmitted to the first optical fiber 400a is transmitted toward the optical device chip 130 and the remaining light is reflected back to the second optical fiber 400b according to the characteristics of the optical reflective layer 340. Also, the beam-splitting (or wavelength-selective) PD optical module may be configured such that light having a specific wavelength, out of light having several wavelengths transmitted to the first optical fiber 400a, is transmitted to the optical device chip 130 and the remaining light may be reflected back to the second optical fiber 400b according to the characteristics of the optical reflective layer 340.

Figure 17:
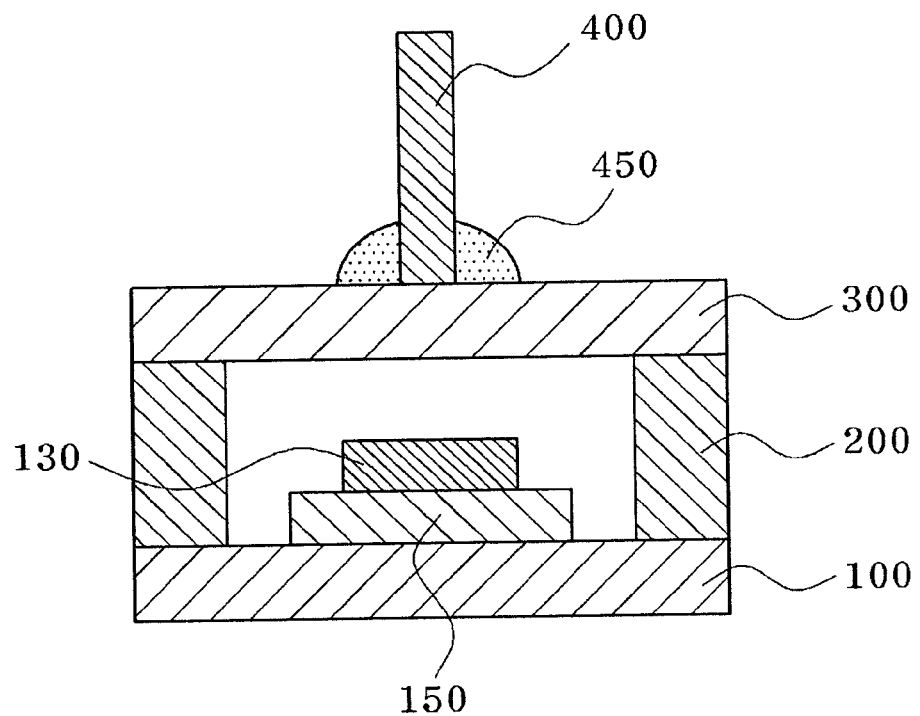
FIGS. 17 and 18 are cross-sectional views of a combined structure of an optical device chip and an electronic device chip according to one or more embodiments of the present invention.
Figure 18:
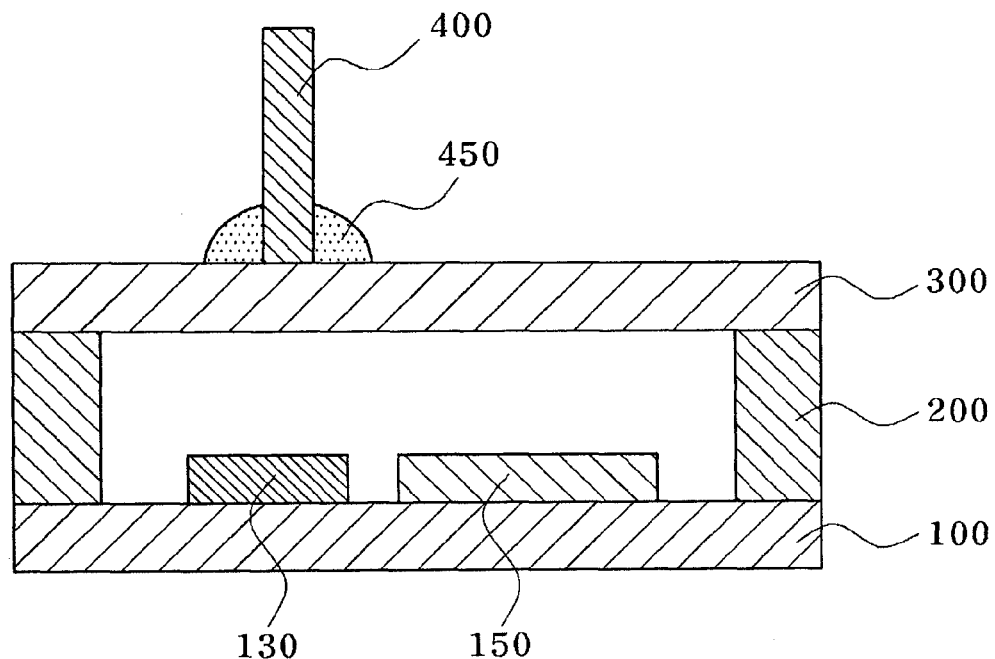

FIGS. 17 and 18 are cross-sectional views of a combined structure of an optical device chip and an electronic device chip according to one or more embodiments of the present invention.

Referring to FIGS. 17 and 18, an integrated optical device module may be easily manufactured by use of an optical module structure according to one or more embodiments of the present invention. That is, it is possible to manufacture an optical module by integrating an electronic device chip 130 and an electronic device chip 150 in one structure.

Here, the term "electronic device" may refer to, for example, an inductor, a capacitor, a resistor, an amplifier (AMP), a driver integrated circuit (IC), or a controller IC. As shown in FIG. 17, the optical device chip 130 may be adhered onto the electronic device chip 150. Alternatively, as shown in FIG. 18, the optical device chip 130 and the electronic device chip 150 may be adhered onto a substrate 100 adjacent to each other.

As described above, when the optical device chip 130 and the electronic device chip 150 are integrated in one structure, electrodes configured to adhere and connect the optical device chip 130 and the electronic device chip 150 and enable external transmission of signals from the optical device chip 130 and electronic device chip 150 should be formed in the substrate 100.

Similarly, to prevent light incident from the optical fiber 400 to the optical device chip 130 from being reflected and incident back to the optical fiber 400, as shown in FIGS. 12 through 14, the optical fiber 400 may be naturally tilted to a vertical axis (or an optical axis of the optical fiber 400) and adhered to a cover 300.

Figure 19:
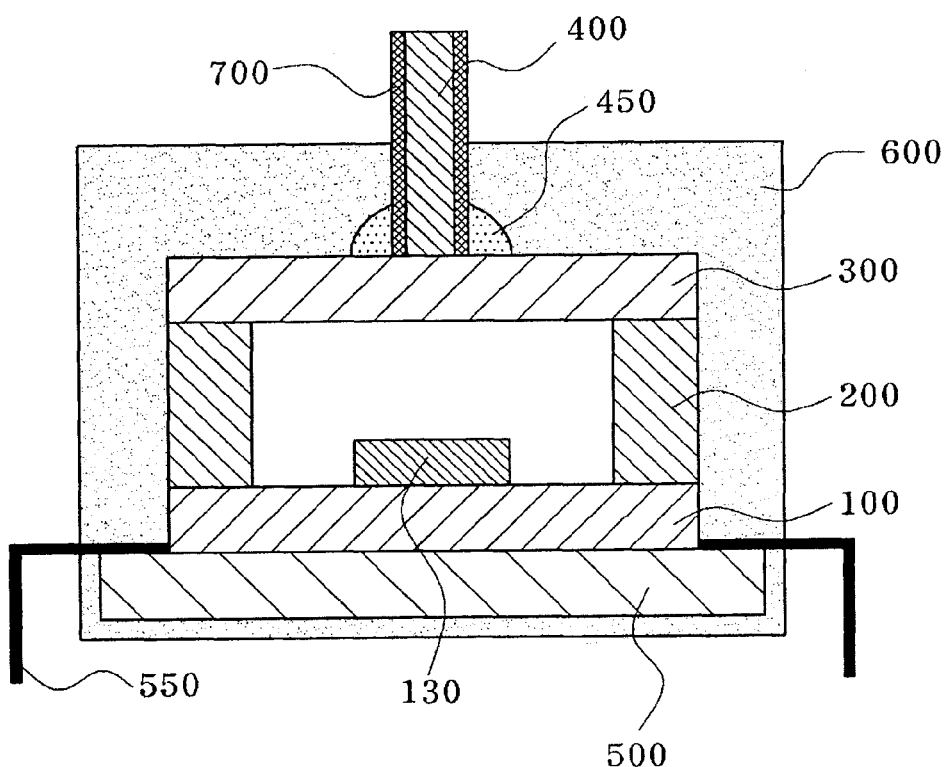
FIG. 19 is a cross-sectional view of a structure obtained by mounting an optical module according to one or more embodiments of the present invention on the surface of an external circuit substrate and molding the resultant structure.

FIG. 19 is a cross-sectional view of a structure obtained by mounting an optical module according to one or more embodiments of the present invention on the surface of an external circuit substrate and molding the resultant structure. An external circuit substrate 500 may be a typical PCB or a typical substrate formed of a ceramic, a semiconductor, a plastic, glass, or a polymer on which electrodes may be formed.

Referring to FIG. 19, as described above, an optical module according to one or more embodiments of the present invention may be mounted on a surface of the external circuit substrate 500 and used.

For example, the optical module according to one or more embodiments of the present invention may be combined with the circuit substrate 500, lead frames or pins 550 may be connected to the circuit substrate 500, and a substrate 100, a spacer 200, a cover 300, and a portion of an optical fiber 400 along with the circuit substrate 500 may be molded using an epoxy mold compound (EMC) 600, which is usually adopted for a packaging process of electronic devices.

In this case, an additional protection tube 700 may be provided outside the optical fiber 400 to effectively protect the optical fiber 400 from damage caused by excessive bending of the optical fiber 400.

Figure 20:
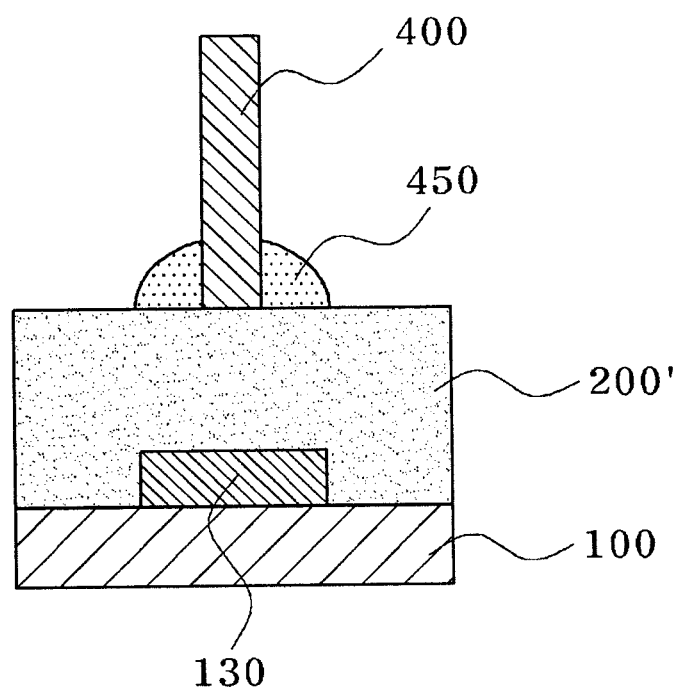
FIG. 20 is a cross-sectional view of an optical module according to one or more embodiments of the present invention.
Figure 21:
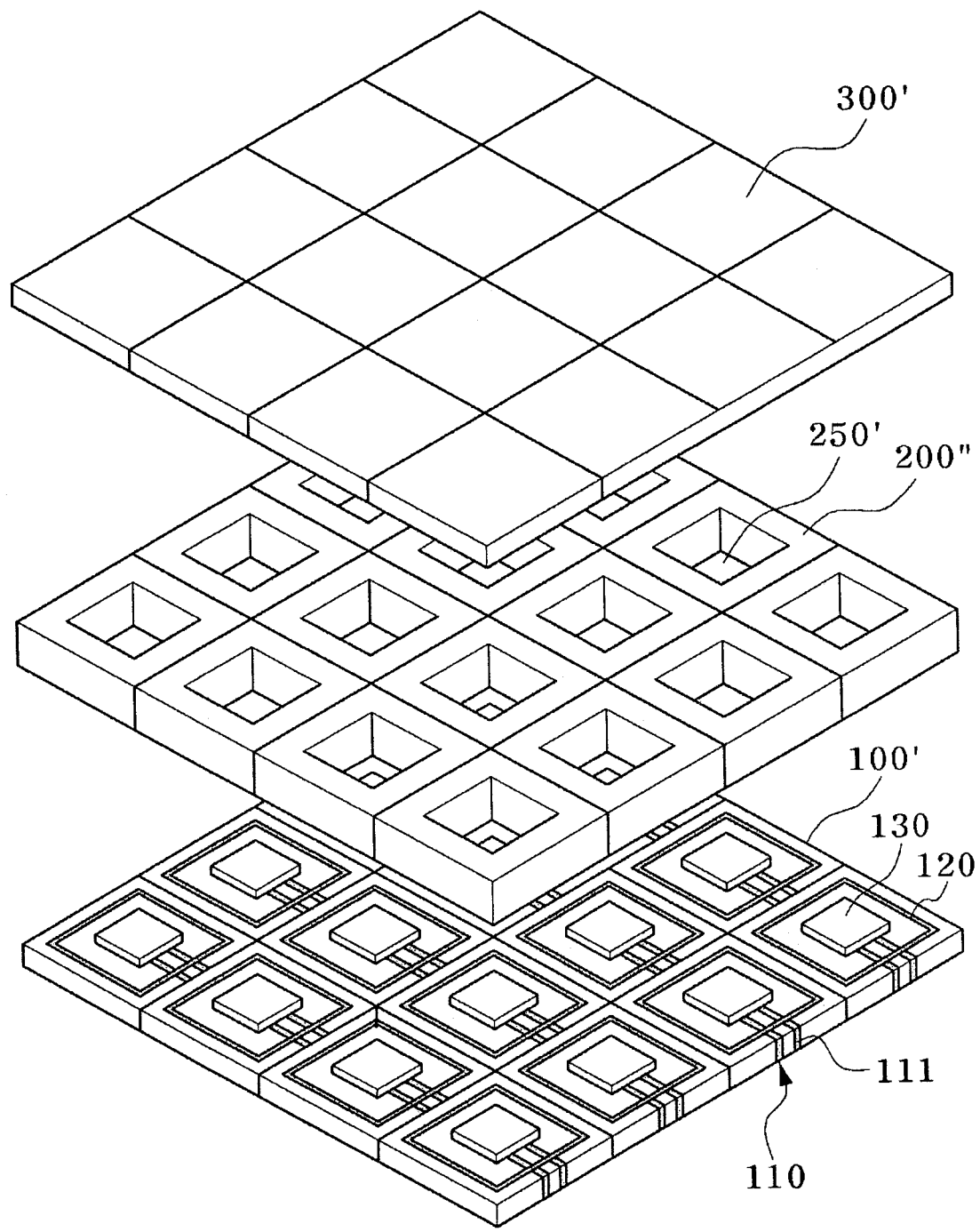
FIGS. 21 through 27 are perspective and cross-sectional views of a method of manufacturing an optical module according to one or more embodiments of the present invention.

FIG. 20 is a cross-sectional view of an optical module according to one or more embodiments of the present invention.

Referring to FIG. 20, in the optical module according to one or more embodiments of the present invention, the spacer 200 and the cover 300 applied to one or more embodiments of the present invention may not be separately prepared and combined with each other but be integrally formed.

For example, the optical module according to one or more embodiments of the present invention may include a substrate 100 having a top surface on which an optical device chip 130 is provided, a spacer layer 200' formed on the entire surface of the substrate 100 to mold the entire optical device chip 130, and an optical fiber 400 combined with the spacer layer 200' in a position corresponding to a position of the optical device chip 130.

In this case, the spacer layer 200' may be fabricated as a mold type by pouring, for example, a transparent epoxy or polymer epoxy, on the substrate 100 to which the optical device chip 130 or both the optical device chip 130 and an electronic device chip (refer to 150 in FIGS. 17 and 18), and the optical fiber 400 may be adhered onto the spacer layer 200'.

In this case, a surface of the spacer layer 200' to which the optical fiber 400 is adhered may maintain good transparency and flatness so that light emitted from a light source is transmitted to the optical fiber 400 or light emitted from the optical fiber 400 is transmitted to a light receiving device (i.e., the optical device chip 130) without distortion of light.

FIGS. 21 through 27 are perspective and cross-sectional views of a method of manufacturing an optical module according to one or more embodiments of the present invention.

Referring to FIGS. 21 through 27, the method of manufacturing the optical module according to one or more embodiments of the present invention may include, first, preparing a substrate 100' defined by a plurality of unit device regions, arranging optical device chips 130 on the respective unit device regions of the substrate 100', and combining the optical device chips 130 with the respective unit device regions of the substrate 100'.

Next, a spacer layer 200" having a plurality of through holes 250' and defined by a plurality of unit device regions may be prepared and combined with the substrate 100' such that the optical device chips 130 are respectively inserted into the through holes 250' of the spacer layer 200".

Thereafter, a cover layer 300' defined by a plurality of unit device regions may be combined with the spacer layer 200" to close the respective through holes 250' of the spacer layer 200", and the resultant structure may be diced into at least one unit device region. In this case, the resultant structure may be diced into a unit device or an array type (refer to FIGS. 22 and 23).

Finally, optical fibers 400 may be respectively arranged on and combined with the diced unit device regions of the cover layer 300' using a transparent epoxy 450 in positions corresponding to positions of the respective optical device chips 130.

Figure 22:
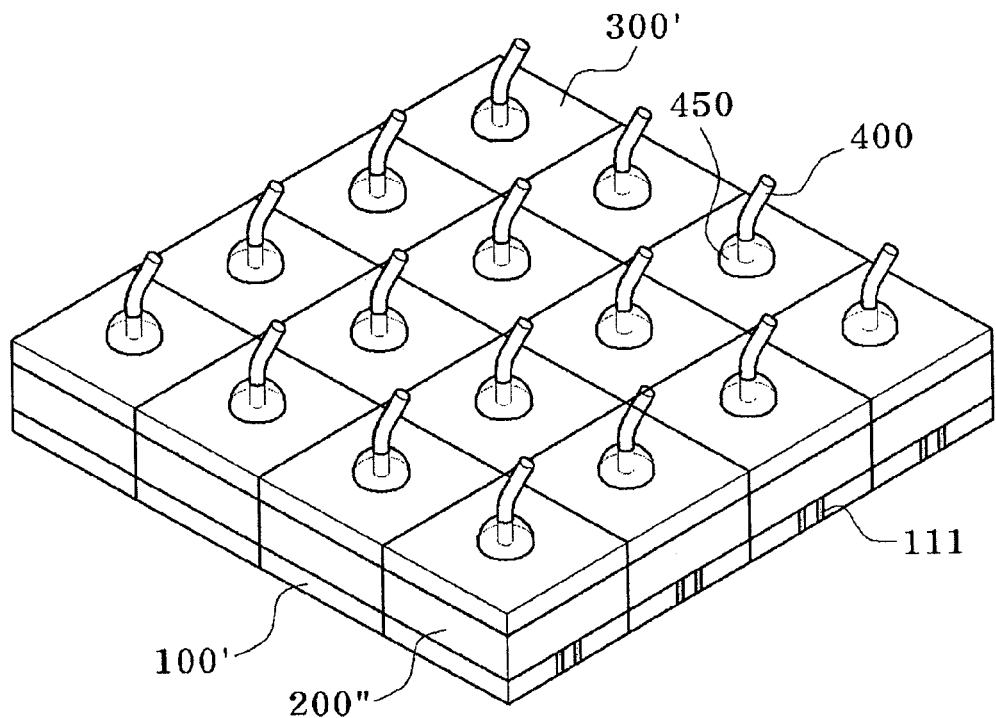
Figure 23:
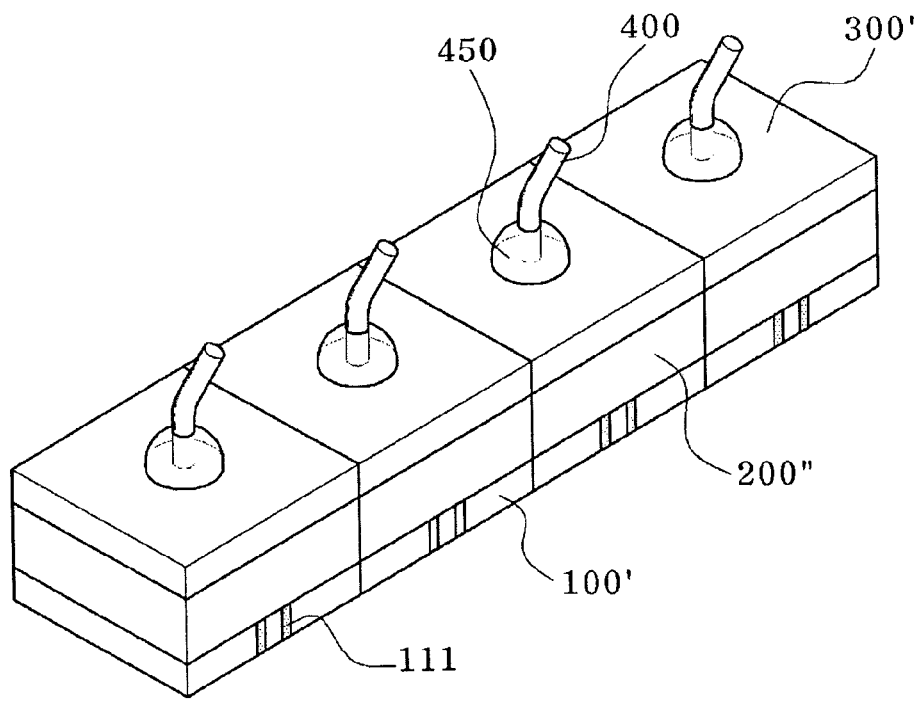
Figure 24:
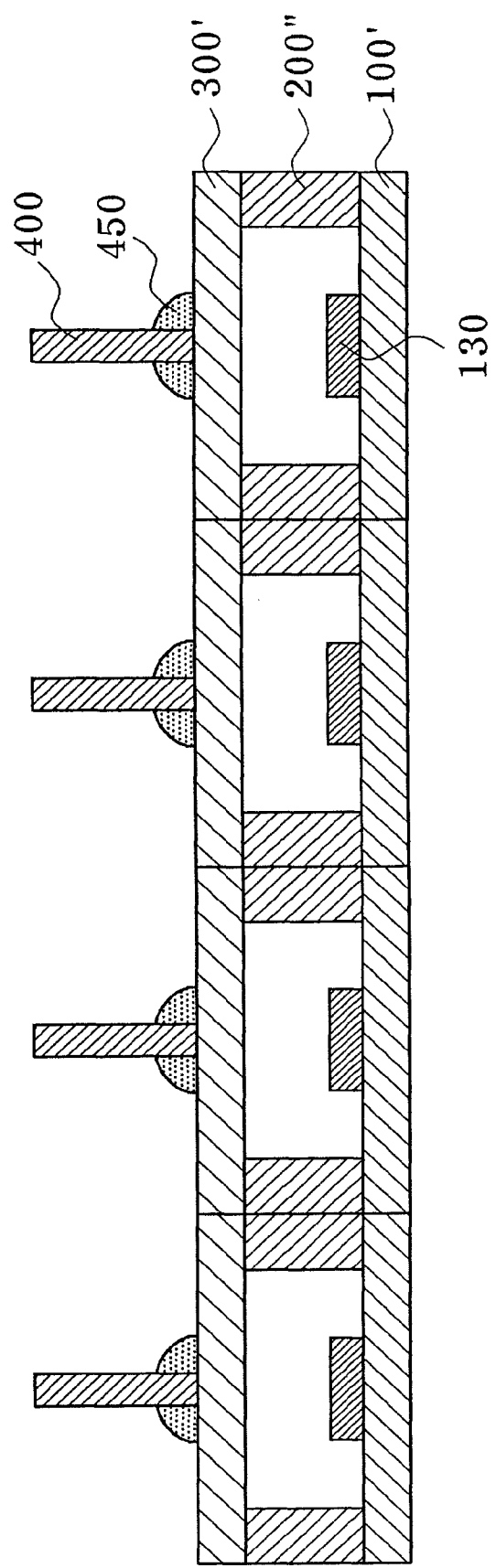

Meanwhile, as shown in FIG. 22, the optical fibers 400 may be combined with the cover layer 300' before the resultant structure is diced into the unit device regions. Also, respective optical fibers 400 may be separately aligned with and adhered to the cover layers 300'. Alternatively, an array of optical fibers 400 may be aligned with and adhered to unit devices diced as an array type.

In the above-described method of manufacturing an optical module according to one or more embodiments of the present invention, when the substrate 100' is formed of an insulator, a required electrode pattern 110 may be directly formed. However, when the substrate 100' is formed of a conductor, after an insulating layer is formed of a dielectric material, a required electrode pattern 110 may be formed (or deposited) on the insulating layer, an insulating layer may be formed again, and a solder pattern 120 required for adhesion to the spacer layer 200" may be formed thereon.

Figure 25:
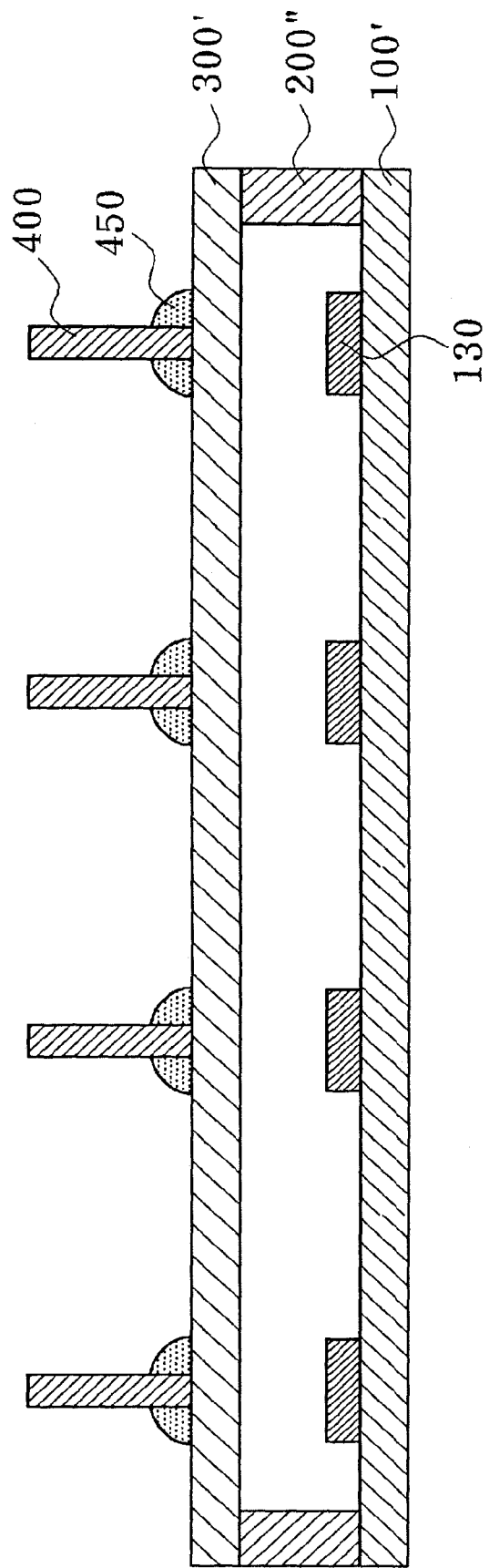

As described above, after the resultant structure is diced one or two-dimensionally, the optical fiber 400 may be adhered using a wafer-level adhesion process so that the optical module can be fabricated. In this case, as shown in FIG. 25, the spacer layer 200" may be omitted in an center portion of the substrate 100", and the spacer layer 200" may be inserted between only end portions of the substrate 100' and the cover layer 300' to manufacture an optical module, instead of forming the spacer layer 200" for each of the optical device chips 130.

Figure 26:
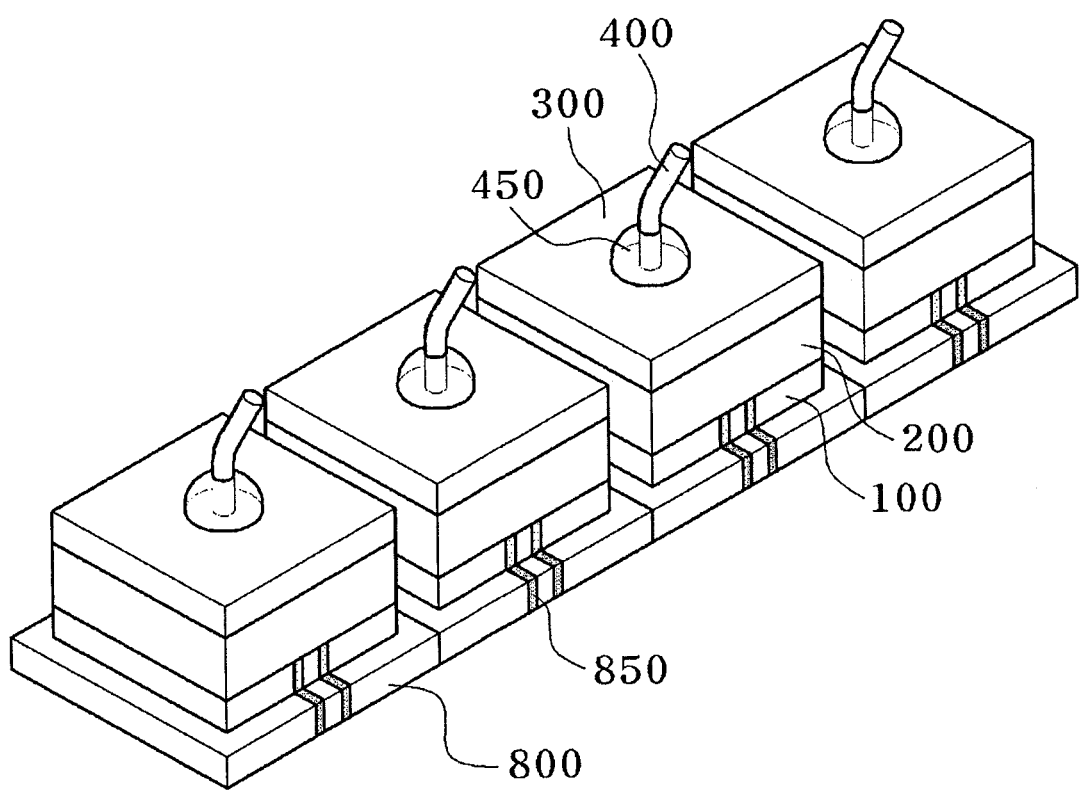
Figure 27:
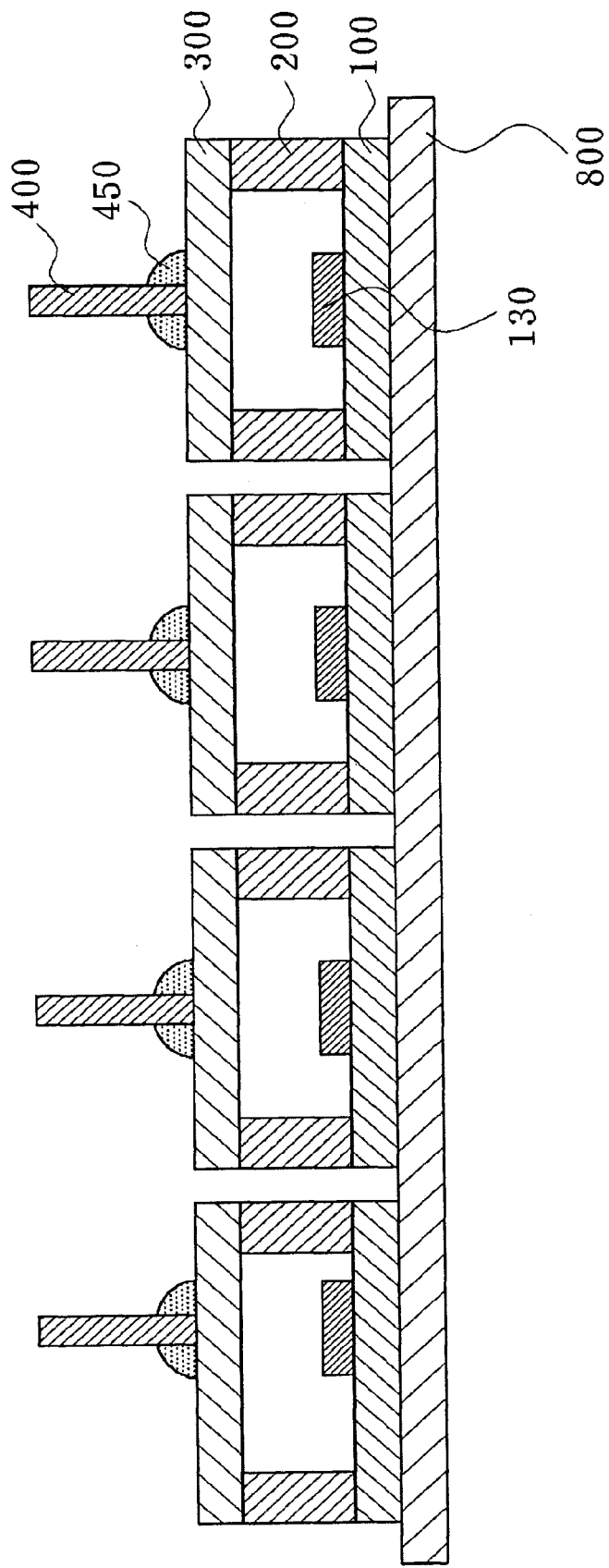

Meanwhile, as shown in FIGS. 26 and 27, an array of optical modules may be manufactured by mounting basic unit optical modules according to one or more embodiments of the present invention, each of which is the same as described with reference to FIGS. 1 through 3, on an additional substrate 800 including electrodes 850.

The additional substrate 800 may be a PCB or a ceramic, a semiconductor, a plastic, glass, or a polymer on which electrodes may be formed. In this case, the optical modules are mounted on the substrate 800 after properties of the respective optical modules are previously measured. Thus, because the array of optical modules may have uniform unit properties, yield may be increased. The array of optical modules may also be manufactured using the EMC described with reference to FIG. 19.

According to the above-described optical module and method of manufacturing the same, miniaturization can be enabled, and because required components can be using a semiconductor process, the components with the same standard requirements can be produced in large quantities, thereby reducing the costs of manufacturing. Furthermore, optical transceiver modules and packaging systems having various shapes can be provided.

According to one or more embodiments of the present invention, because an optical fiber may be used as cleaved, an optical fiber ferrule, which is typically used to align the optical fiber with an optical device, is not required, thus facilitating cost reduction and minimization.

Furthermore, according to one or more embodiments of the present invention, a device size may be greatly reduced during manufacture of an array-type device, a surface-mounting optical device may be manufactured, individual optical modules may be separately packaged, and wafer-level packaging may be enabled.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical module comprising:
a substrate including an optical device chip disposed on a top surface thereof;
a spacer having at least one through hole and combined with the substrate on the substrate to insert the optical device chip into the through hole;
a cover combined with the spacer on the spacer to close the through hole;
an optical fiber combined with the cover on the cover in a position corresponding to a position of the optical device chip, and
a groove unit or protrusion unit having an inclined surface tilted at a predetermined angle formed on a top surface or bottom surface of the cover in a position corresponding to a combined position of the optical fiber,
wherein the optical module is configured such that light transmitted through the optical fiber is incident to the optical device chip or light emitted from the optical device chip is incident to the optical fiber, and
wherein an electrode pattern is further formed on the substrate and electrically connected to the optical device chip.

2. The optical module of claim 1, further comprising an electronic device chip electrically connected to the electrode pattern, wherein the electronic device chip is disposed under or in a vicinity of the optical device chip.

3. The optical module of claim 1, wherein at least one lateral surface of the substrate protrudes outward from a lateral surface of the spacer.

4. The optical module of claim 1, wherein the optical fiber is fixedly combined with the cover on the cover using a transparent epoxy.

5. The optical module of claim 1, wherein an anti-reflective optical coating layer is further formed on top and bottom surfaces of the cover.

6. The optical module of claim 1, wherein a lens is further formed on a top surface or bottom surface of the cover in a position corresponding to the optical fiber, and wherein, when the lens is formed on a top surface of the cover, the lens is fixedly combined with the cover using a transparent epoxy such that the lens is spaced a predetermined distance apart from the optical fiber.

7. The optical module of claim 1, wherein a lens is further formed on the reverse surface of the top or bottom surface of the cover on which the groove unit or protrusion unit is formed, wherein, when the lens is formed on the top surface of the cover, the lens is fixedly combined with the cover using a transparent epoxy such that the lens is spaced a predetermined distance apart from the optical fiber.

8. The optical module of claim 1, wherein, when the substrate is mounted on a surface of an additional circuit substrate and the substrate including the circuit substrate, the spacer, the cover, and the optical fiber are partially molded, a protection tube is further disposed to surround the optical fiber to prevent damage to the optical fiber.

9. The optical module of claim 1, wherein a wavelength-selective filter is further coated on a top surface or bottom surface of the cover so that light having a specific wavelength, out of light having various wavelengths transmitted through the optical fiber, passes through the cover.

10. The optical module of claim 1, wherein the optical device chip is arranged on and combined with the substrate in an array shape.

11. An optical module comprising:
a substrate including an optical device chip disposed on a top surface thereof;
a spacer having at least one through hole and combined with the substrate on the substrate to insert the optical device chip into the through hole;
a cover combined with the spacer on the spacer to close the through hole; and
an optical fiber combined with the cover on the cover in a position corresponding to a position of the optical device chip,
wherein the optical module is configured such that light transmitted through the optical fiber is incident to the optical device chip or light emitted from the optical device chip is incident to the optical fiber,
wherein an electrode pattern is further formed on the substrate and electrically connected to the optical device chip, and
wherein, to prevent light incident to the optical device chip through the optical fiber from being reflected back toward the optical fiber, a section of the optical fiber is cleaved in a vertical direction or at a tilted angle to an optical axis of the optical fiber and the optical fiber is combined with the cover on the cover at a predetermined tilted angle to the cover.

12. An optical module comprising:
a substrate including an optical device chip disposed on a top surface thereof;
a spacer having at least one through hole and combined with the substrate on the substrate to insert the optical device chip into the through hole;
a cover combined with the spacer on the spacer to close the through hole; and
an optical fiber combined with the cover on the cover in a position corresponding to a position of the optical device chip,
wherein the optical module is configured such that light transmitted through the optical fiber is incident to the optical device chip or light emitted from the optical device chip is incident to the optical fiber,
wherein an electrode pattern is further formed on the substrate and electrically connected to the optical device chip, and
wherein an optical reflective layer is further formed on a top surface or bottom surface of the cover and the optical fiber having a V shape is combined with the cover so that light having a specific wavelength, out of light transmitted to an optical fiber disposed in one direction, passes through the optical device chip and the remaining light is reflected back toward an optical fiber disposed in another direction or so that some light having the same wavelength transmitted to the optical fiber disposed in one direction passes through the optical device chip and the remaining light is reflected back toward the optical fiber disposed in another direction.

* * * * *